Figure 1:
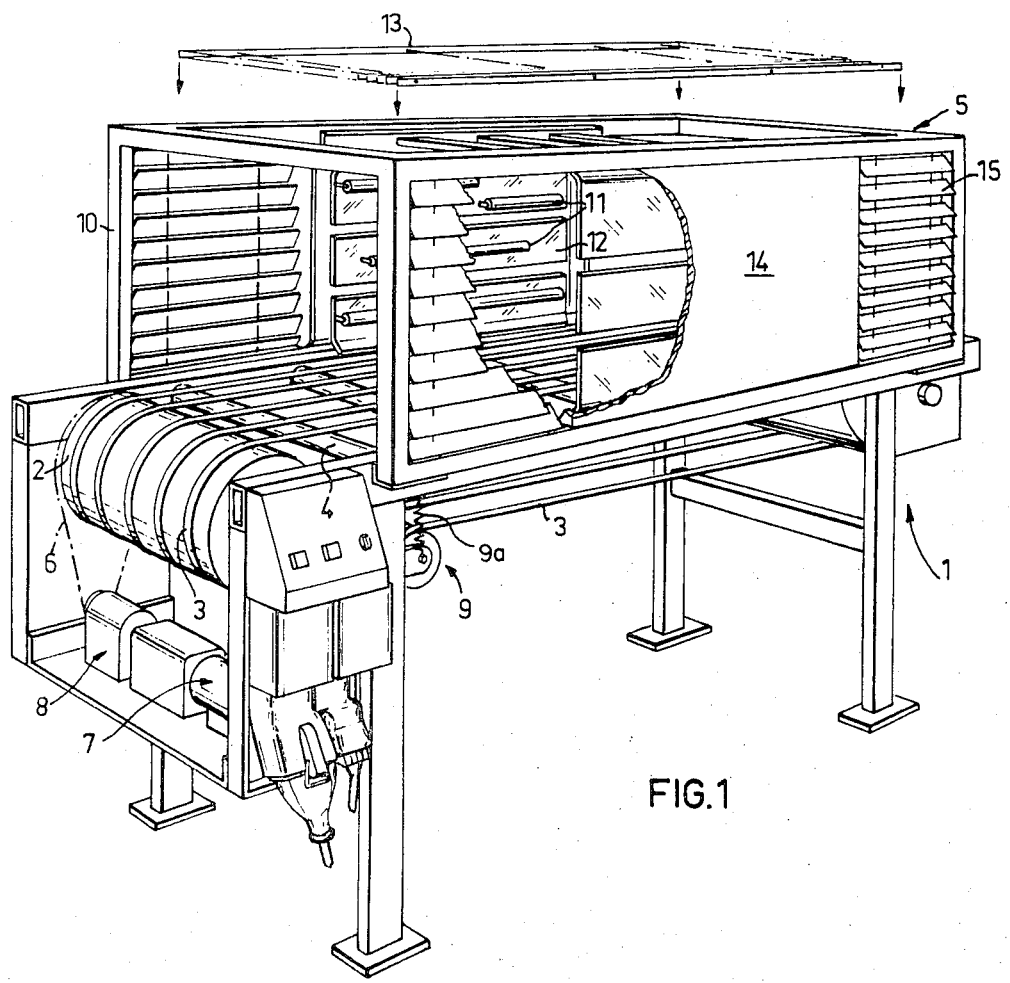

United States Patent [19]
Linde

[11] 3,818,182

[45] June 18, 1974

[54] DEVICE FOR SHRINKING A WRAPPER, CONSISTING OF A PLASTIC SHEETING SHRINKABLE BY HEATING, AROUND A TRANSPORT UNIT

[75] Inventor: Lars Hilding Linde, Vallingby, Sweden

[73] Assignee: AB Bonnierforetagen, Stockholm, Sweden

[22] Filed: June 26, 1972

[21] Appl. No.: 266,282

[30] Foreign Application Priority Data
July 12, 1971  Sweden.............................. 9013/71
Feb. 9, 1972  Sweden.............................. 1525/72

[52] U.S. Cl.................... 219/388, 34/207, 34/208, 53/30, 53/184, 219/405, 219/411, 219/553, 219/352
[51] Int. Cl.............................................. F27b 9/06
[58] Field of Search.......... 219/352, 388, 405, 411, 219/553; 53/30, 184; 34/207, 208, 212

[56] References Cited
UNITED STATES PATENTS

| | | | |
|---|---|---|---|
| 2,472,293 | 6/1949 | Groven | 219/411 X |
| 2,980,544 | 4/1961 | Mills | 219/411 X |
| 3,222,800 | 4/1965 | Siegel et al. | 34/212 |
| 3,249,741 | 5/1966 | Mills | 219/388 |
| 3,312,811 | 4/1967 | Shanklin | 219/388 |
| 3,389,530 | 6/1968 | Yates | 53/30 |
| 3,399,506 | 9/1968 | Howe, Jr. | 53/184 X |
| 3,515,854 | 6/1970 | Williams | 219/388 |
| 3,529,129 | 9/1970 | Rees | 219/388 X |
| 3,609,295 | 9/1971 | Bielefeldt | 219/388 |

FOREIGN PATENTS OR APPLICATIONS
693,878  7/1953  Great Britain...................... 219/388

*Primary Examiner*—Volodymyr Y. Mayewsky
*Attorney, Agent, or Firm*—Ostrolenk, Faber, Gerb & Soffen

[57] ABSTRACT

A device for shrinking a wrapper, consisting of a plastic sheeting shrinkable by heating, around a transport unit which can consist of a collection of goods of arbitrary type, for example small packages or boxes, magazines or the like. The device comprises electric radiation elements which act upon the wrapper on at least one side of the transport unit and which are mounted on a carrier as well as means for producing a relative movement between the transport unit and the carrier. The energy maximum of the radiation elements is at a wave-length of about 1.2 um. The major portion of the radiation lies within the wavelength range 0.4–4.0 $\mu$m, preferably 0.7–2.0 $\mu$m. The elements are mounted in front of essentially flat reflectors. The elements with their accompanying reflectors are arranged to form a tunnel arch over the transport unit whose plastic wrapper is being heated for shrinking.

3 Claims, 2 Drawing Figures

DEVICE FOR SHRINKING A WRAPPER, CONSISTING OF A PLASTIC SHEETING SHRINKABLE BY HEATING, AROUND A TRANSPORT UNIT

The present invention relates to a device for shrinking a wrapper, consisting of a plastic sheeting shrinkable by heating, round a transport unit. The wrapper proper can consist of a hood or a sleeve which has been placed before-hand in an appropriate manner and with appropriate devices, over and around the transport unit, which in turn can consist of a collection of goods of arbitrary type, for example small packages or boxes, magazines or the like, which by shrinking of the wrapper are held together by the same as a result of the resultant contraction.

A number of shrinkable plastic sheetings appropriate for this purpose are known but they all have the common disadvantage of being highly sensitive to overheating and are therefore easily susceptible to burning damage, which negatively affects the appearance and durability of the shrunken wrapper. This fact, together with the fact that comparatively large quantities of heat energy are necessary to enable the shrinking to occur quickly, have prevented the device for achieving shrinkage from being able to work fast enough and at the same time both retaining a good result as regards appearance and strength of the finished packages or exploiting well the practised effect, so as to be suitable for placement at the end of a production line.

In previously known devices for shrinking plastic sheeting, where hot air was used for heating the sheetings, large heat losses occurred as a result of the large amounts of heat generated which did not affect the object to be shrunk but instead merely raised the surrounding temperature with accompanying ventilation problems. Furthermore, these devices are limited in their use, as it is difficult to use them for intermittent operation.

Similar difficulties have also come up in the known devices, in which electrically heatable radiation heating elements were used. This was because the pre-heating times of the radiation heating elements were so long that the device could not be operated intermittently.

One object of the present invention is to produce a device of the type mentioned in the introduction, which: is capable of working very rapidly with only small heat losses operates effectively, intermittently as well as continuously, is dependent upon the frequency with which transport units are introduced into the same for shrinking of the plastic sheeting wrapper, and at the same time has a simplified construction and still yields a perfectly satisfactory shrinking result without any heat damage to the plastic sheeting wrapper.

For this purpose the invention starts with a known device which comprises electrical radiation elements, acting on the plastic wrapper on one side of the transport unit, and mounted on a carrier possibly consisting of several parts, as well as means for achieving a relative motion between the transport unit and the carrier. The stated purpose is achieved completely and the disadvantages mentioned here are completely avoided if, according to the invention, the energy maximum of the radiation elements is at a wave length of about 1.2$\mu$m and the major part of the radiation lies within the wavelength of 0.4–4.0$\mu$m, preferably 0.7–2.0$\mu$m, and if the elements are mounted in front of essentially flat reflectors.

By selecting radiation elements with the characteristics given here as well as essentially flat reflectors working in conjunction with said elements, it has been shown that very even heating is obtained in the plastic sheeting wrapper, and that burn damage due to local overheating is eliminated. It has been further shown that the losses of effect have been reduced and that the operating effect has been able to be held down. A device constructed according to the invention has also been shown to function excellently during intermittent as well as continuous operation.

In one embodiment for the device according to the invention which has been shown to be especially expedient, the radiation elements are mounted partly on two essentially vertical and opposing sides of the carrier and partly on an essentially horizontal side joining said sides with each other at the top, so that the carrier together with the elements, with their accompanying reflectors, forms a tunnel arch over a transport unit whose plastic wrapper is being heated. This tunnel-like construction of the new shrinking device makes it constructively easy to produce the relative motion between the transport unit and the carrier, and the means for producing this motion can either be set up to move the transport unit in relation to the carrier which is provided with radiation elements and reflectors or can also be set up to move the carrier in relation to the transport unit.

In order to obtain a heating which is as nearly even as possible of the parts of the plastic sheeting wrapper where the risk of burn damage is greatest, the radiation elements on both of the carrier's essentially vertical sides should be mounted with uneven vertical distribution on the respective sides. The radiation elements on the essentially horizontal side of the carrier however, should be mounted with even distribution, especially if the transport unit is considerably broad in relation to its height. If the dimensions of the device according to the invention are small in relation to the geometrical dimensions of the radiation elements, the radiation elements can be advantageously mounted with their longitudinal axes extending in the longitudinal direction of the device, because this contributes to the objective of achieving an even radiation intensity in the device.

So that the convection currents occurring in a device according to the invention do not create problems of temperature regulation, the tunnel arch or heating member can be provided with a bottom which is at least partially open or at least perforated and thereby provides at least one regulating duct opening which operates in conjunction with transport units which, while passing through the tunnel arch or heating member, serve individually as moving duct members in relation to the duct opening. Because the transport units passing through the tunnel arch or heating member operates in conjunction with the duct opening which lets in air and is positioned in the bottom of the heating member an exceptionally good removal of possible excess convection heat is achieved. When a packaging unit is inside the tunnel arch, it covers, dependent on its size, a lesser or greater part of the duct opening and thereby will, at that time when high heat is required in the tunnel arch, prevent an overly extensive ventilation of the same. On the other hand, when the transport unit has passed the oven and the duct opening has thereby been uncovered, a period of intensive ventilation is initiated. The intensive ventilation lasting until the next transport unit reaches the tunnel arch or heating member, which ventilation prevents the convection heat in the tunnel arch or heating member from producing such a high temperature inside the same that the wrappers on the following transport units are damaged by the heat. At the same time as transport units with shrunken wrappers leave the heating member, a certain amount of heat is naturally also carried away with the units themselves.

In an especially suitable embodiment for the device according to the invention the bottom of the tunnel arch or heating member is made up of the means for achieving the relative movement between the transport unit and the tunnel arch or heating member and consists of an endless track. With this embodiment it is no longer necessary to have a special bottom in the device, but rather the track which is used for conveying the transport units through the tunnel arch or heating member can be used as a bottom instead. By allowing the track to then have a mesh structure, an excellent ventilation is obtained, particularly when the track is free from transport units which cover up the mesh structure of the same.

Figure 2:
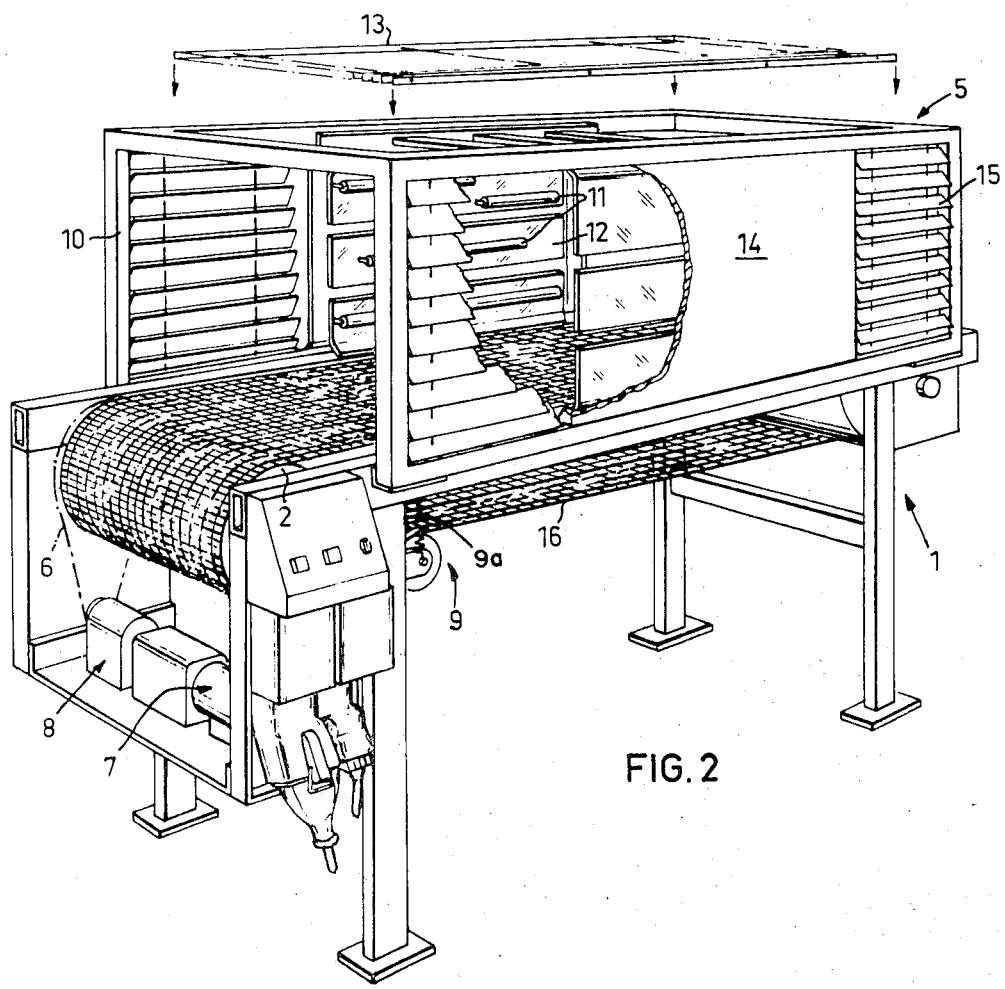

In the following, the invention will be more closely described with references made to two embodiments, shown in the enclosed perspective drawings, for a device made according to the invention. FIG. 1 shows an embodiment in which the conveyor track through the device consists of a plurality of endless steel strips, while FIG. 2 shows an embodiment with a conveyor track consisting of an endless mesh track.

The embodiments shown in the drawings have parts of their outside shells cut away on one of their longitudinal sides to better reveal the interiors of the devices. The embodiments in question most closely resemble tunnels inside and through which the transport units, which are intended for packaging and are provided with plastic sheeting wrappers shrinkable by heating, are fed with the help of conveyor belts. In the embodiment shown in FIG. 1 a number of steel strips are positioned to run abreast of one another as conveyor strips, while the embodiment according to FIG. 2 has an endless mesh conveyor track, preferably constructed of a steel material. Transport units provided with shrinkable plastic wrappers are deposited onto the conveyor belts by known devices. The wrappers can have the shape of a sleeve or a hood which is only relatively loosely positioned around the transport units.

As is evident from the drawings the shown embodiments for the device according to the invention each consist more precisely of an essentially table-like rack 1. A drum 2 of steel material is attached at both ends of said rack. In the embodiment according to FIG. 1 five endless steel strips 3, are placed abreast of one another and run around both drums 2. The upper parts of these strips are supported by, in addition to the drums 2, also by a number of support rollers 4, extending as do the drums 2, across the rack 1 and journalled in it. The upper parts of the steel strips 3 together with the drums 2 and the support rollers 4 serve as a transport track for the transport units in and through the tunnel-like heating member 5 mounted on top of the rack 1. The steel bands 3 are put in motion by one of the drums 2 which is driven, by means of a chain 6, by an electric motor 7 with a continuously variable gearbox 8, both of which last mentioned devices are carried by the rack 1. The appropriate tension as well as lateral control of the steel strips is achieved by a number of press rollers 9, equal to the number of steel strips mounted on the underside of the rack 1. These rollers are provided on their circumferences with tracks for the strips 3 and are mounted individually on their respective levers, which are hinged on the rack. Each of the levers is individually spring-loaded in the direction towards the rack by springs 9a so that this loading produces the desired tension in the steel strip which engages the press roller on the respective spring-loaded lever. This arrangement for the lateral control and tension of the steel strips 3 is only one of many conceivable alternatives and does not lie within the limits of the present invention.

Because the steel strips 3 are at least somewhat heated up when their upper parts pass through the heating member 5, the drums 2 have a large enough mass that they are capable of cooling the strips 3 afterwards, which normally are only heated for a short time. In the embodiment shown here the strips 3 run continuously at an optionally adjustable speed which allows a maximum of 12 transport units per minute to pass through the heating member or tunnel 5 for shrinking of the plastic sheeting wrapper.

In the embodiment according to FIG. 2 the steel strips appearing in FIG. 1 are replaced by an endless mesh track 16, preferably constructed of a metal material. The upper part of said track serves, together with the drums 2, as a conveyor track for the transport units into and through the tunnel-arch-shaped heating member 5 which is mounted on the rack 1 and at the same time makes up the bottom of said heating member. The tension and lateral control of the track 16 are preferably achieved by known devices which are not described in more detail here. The heating member or shrinking tunnel 5 which is mounted on top of the rack 1 consists primarily of a framework 10 made up of pipe, the cross section of which has the shape of an upside-down U. In the middle and on the insides of this framework of this carrier 10, electric radiation elements 11 are mounted in front of flat heat reflectors 12. The energy maximum of the radiation elements 11 lies at a wave-length of about 1.2 $\mu$m and the major part of the radiation falls within the wave-length range of 0.4–4.0 $\mu$m, preferably 0.7–2.0 $\mu$m. By choosing elements with this radiation characteristic and by allowing the elements to work in conjunction with the flat reflectors 12, a diffuse radiation is obtained in the heating member of shrinking tunnel 5, which radiation has been shown to completely avoid the risks of burn damage to the plastic wrapper, which both parabolic and focal-point-producing reflectors have previously been shown to produce. The flat reflectors 12, by producing this diffuse radiation, create the possibility of only a limited effect being required, in contrast with the case when other types of reflectors are used.

In order that at least three sides of the wrapper around a transport unit being fed through the device shall by heated during and for shrinkage, the radiation elements 11, in the embodiments shown here are mounted partly on the two essentially vertical and opposing sides of the carrier 10, and partly on the inside of the surface forming the roof, which is essentially horizontal and connects both of said essentially vertical surfaces at the top with each other. The heating member 5 receives in this way its tunnel-shaped appearance.

In order that the convective heat currents rising along both of the essentially vertical sides will not be concentrated to such an extent that heat damage occurs on the plastic wrapper, the radiation elements mounted on these sides are arranged with uneven mutual vertical distribution on the respective sides. The radiation elements 11 on the essentially horizontal side are, on the other hand, mounted with equal mutual distribution.

In the embodiments shown here for the device according to the invention the radiation elements 11 working in conjunction with the flat reflectors 12 are mounted with their longitudinal axes extending lengthwise to the device. This is the case since the embodiments shown have relatively small dimensions. In larger embodiments however it is suitable that the radiation elements be oriented with their longitudinal axes in other directions also.

Also, in certain cases, especially if one wishes to also irradiate those sides of the plastic wrapper which are on the transport unit's front and back sides respectively while passing through the heating member or shrinking tunnel 5, radiation elements, not shown here, can be mounted in the roof of the carrier 10, and extending across the carrier. These elements could be made to work in conjunction with parabolic reflectors.

On top of the heating means or shrinking tunnel 5 there is provided a lattice-work 13 and behind the reflectors 12 gaps (not shown here) are provided on the sides open at the bottom, so that good ventilation is obtained and so that the arising convection currents will be able to leave the device as quickly as possible. On both of the exterior longitudinal sides, in the middle and outside of the radiation elements with their accompanying reflectors, there are whole and unperforated protective plates 14, while on the ends there are perforated lattice works in the shape of Venetian blinds.

While the transport track consisting of the drums 2, steel strips 3 and support rollers 4 is driven continuously in the embodiment according to FIG. 2, the radiation elements normally work intermittently and only a few seconds at a time in this embodiment, and then only when a transport unit provided with a plastic sheeting wrapper, shrinkable by heating, passes the zone of the heating member or shrinking tunnel 5, which is provided with radiation elements 11. However, the radiation elements 11 are so controlled that they are also capable of working continuously, if the transport units are fed in with such high frequency into said radiation elements zone that more than one transport unit is present there at one time.

The control of the switching on and off of the radiation elements can suitably be achieved by conventional methods, for example by means of a micro-switch which senses the transport unit's arrival in and departure from the radiation element zone.

By mounting flat reflectors within the radiation element zone located under the steel strips 3 and between the support rollers 4, the radiation intensity in the device can be raised, at the same time as the diffuse radiation quality is further improved.

By using a known material for the plastic sheeting wrapper which contains a heat absorber, the radiation can be exploited to the greatest possible extent in a device according to the invention, whereby the required effect is further reduced at the same time as losses are also reduced.

Because of the fact that the bottom of the heating member 5 in the embodiment according to FIG. 2 is the conveyor track 16 which has a mesh structure, an exceptionally good airing of the heating member is obtained in this embodiment when the mesh structure of the track is not covered by a transport unit passing through the heating member. On the other hand, when a transport unit is inside the heating member it covers, depending on its size, a greater or lesser portion of the mesh structure of the track 16 and thereby functions as a movable duct member in relation to the duct opening which the track 16 provides with its mesh structure. The draught through the heating member is thereby reduced when a transport unit is in the heating member and a higher temperature is required therein; while a full draught effect is obtained through the heating member when no transport unit is inside the same. Consequently not only the track 16 but also the radiation elements can work continuously in this embodiment without damage to the plastic wrappers. Special auxiliary means for control of the device beyond an electrical switch are not necessary here. However, said switch can certainly be automatically controlled by transport units' arrival at the heating member and then preferably be combined with a time relay which controls the switching off of the device when the transport unit with a shrunken wrapper has passed through the heating member of the device.

What is claimed is:

1. Apparatus for shrinking a wrapper loosely enclosing an item to be tightly enclosed by the wrapper, said wrapper being formed of heat shrinkable plastic sheet, said apparatus comprising:

an elongated enclosure having a top portion mounted between a pair of side walls and having inlet and outlet openings;

first means for conveying said loosely wrapped item between said side walls from said inlet opening toward said outlet opening;

a plurality of electric heating means for emitting radiant energy being mounted along the interiors of said side walls in a non-uniform manner, said heating means comprising elements for emitting radiant energy whose wave length lies in the range from 0.40 to 4.00 $\mu$m to prevent the radiant energy from penetrating through said wrapper and thereby unduly heating the item contained in the wrapper while sufficiently heating the wrapper to shrink the wrapper and thereby tightly enclose the item contained therein;

flat reflector means positioned between said elements and said side walls to diffuse the radiant energy emitted by said elements and thereby prevent the radiant energy from being concentrated upon the loosely wrapped item as it passes through said enclosure;

said conveyor means having openings adapted to pass air therethrough and upwardly into said enclosure for ventilation purposes;

additional electric heating elements mounted along the interior side of the enclosure top and incorporating reflectors for reflecting the radiant energy emitted from said top mounted elements and whose wave length lies in the range from 0.40 to 4.00 $\mu$m whereby the side wall and top mounted heating means cooperatively form a tunnel arch above said conveying means and about the loosely wrapped item;

the heating elements mounted along said side walls comprising elongated heating elements having their longitudinal axes extending in the direction of movement of the conveying means.

2. The apparatus of claim 1 wherein said conveying means comprises a plurality of spaced closed loop belts entrained about drums rotatably mounted at said inlet and outlet openings for conveying items thereupon while at the same time permitting the passage of air therethrough.

3. The apparatus of claim 1 wherein said conveying means is comprised of a closed loop belt of a mesh material entrained about rotatable drums positioned at the inlet and outlet openings of said enclosure and adapted to pass air through the mesh construction.

* * * * *